United States Patent [19]

Taylor

[11] Patent Number: 5,725,711
[45] Date of Patent: Mar. 10, 1998

[54] PRESS APPARATUS AND METHODS FOR FUSING OVERLAPPED THERMOPLASTIC SHEET MATERIALS

[75] Inventor: Philip A. Taylor, Columbus, Ohio

[73] Assignee: GR Systems, Columbus, Ohio

[21] Appl. No.: 771,508

[22] Filed: Dec. 23, 1996

Related U.S. Application Data

[62] Division of Ser. No. 492,214, Jun. 19, 1995, Pat. No. 5,635,014.

[51] Int. Cl.[6] .................................................... B30B 5/02
[52] U.S. Cl. ...................... 156/228; 156/311; 156/588.3
[58] Field of Search ................................ 156/228, 311, 156/580, 581, 583.1, 583.3; 100/93 P

[56] References Cited

U.S. PATENT DOCUMENTS

| | | | |
|---|---|---|---|
| 4,529,472 | 7/1985 | Hsu | 156/498 |
| 5,261,997 | 11/1993 | Inselmann | 156/580 |

*Primary Examiner*—James Sells
*Attorney, Agent, or Firm*—Thomas S. Baker, Jr.

[57] ABSTRACT

Press-type apparatus for thermally bonding thermoplastic sheet material workpieces is provided with a pair of opposed platen assemblies which each include an inflatable set of compliant diaphragm members, a pair of opposed heat sources which may be brought into and retracted from contact with the diaphragm members, and a source of pressurized fluid for inflating the diaphragm sets and for cooling the heated workpieces. The method for operating the press-type apparatus basically involves both heating and cooling the assembled workpieces while they are simultaneously being retained in a condition of being clamped by the inflatable sets of the diaphragm members.

6 Claims, 4 Drawing Sheets

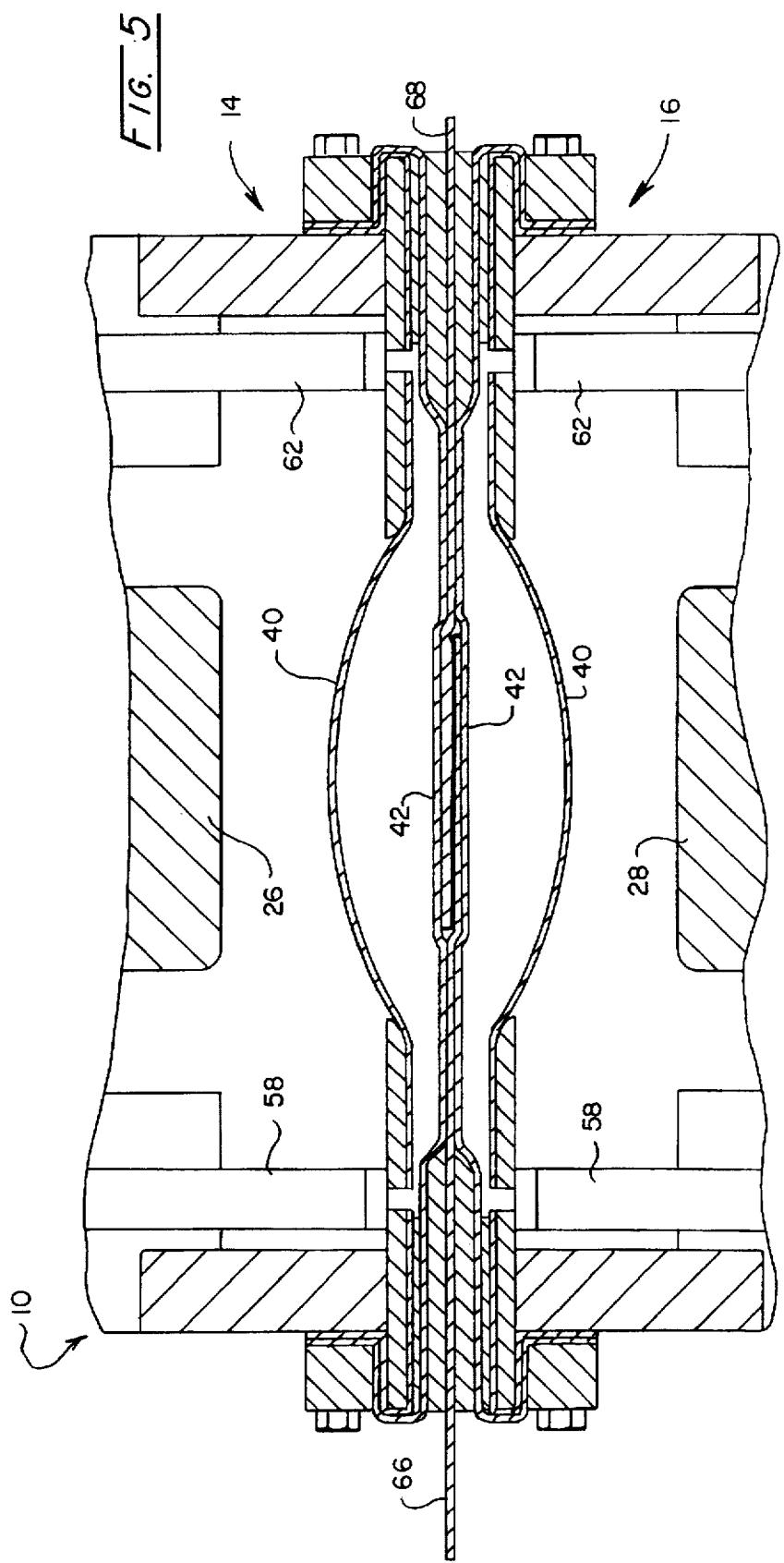

PRESS APPARATUS AND METHODS FOR FUSING OVERLAPPED THERMOPLASTIC SHEET MATERIALS

CROSS-REFERENCES

This is a division of application Ser. No. 08/492,214 filed Jun. 19, 1995 U.S. Pat. 5,635,014 .

FIELD OF THE INVENTION

This invention relates generally to thermally fusing overlapped thermoplastic sheet materials, and particularly concerns both press apparatus and press operating methods for bonding together two or more overlapped thermoplastic sheet components together to efficiently form a fluid-impervious seal in the resulting seam-like region or regions of sheet material joinder.

BACKGROUND OF THE INVENTION

It is often desirable to fuse component sheets of a thermoplastic material such as sheets of polyethylene, polyvinyl chloride (PVC), or polyurethane to form larger sheets, to fabricate more-complicated shapes, or to make attachments. The desired fusion may occur in connection with the fabrication of air-supported building space enclosures, liquid containment tanks, building awnings, or any of numerous other generally similarly constructed products.

Thermoplastic sheet components are made from a number of different materials or combinations of materials. They also are available in various thicknesses, styles, and surface textures. Because of the diversity of such materials, the variety of forms into which they may be fabricated, and varying aesthetic and reliability requirements, many different manufacturing systems have been proposed and utilized for joining thermoplastic sheet components.

The most basic equipment for fusing thermoplastic sheets consists of a hand-held hot air blower device and a hand roller. An operator uses the blower to apply heat between the material plies to be fused as they are rolled together using the roller element. This system is regularly used throughout industry to make repairs because it is highly portable and is readily adaptable to small and irregular jobs. It is also used to fabricate complex shapes as one would find in articles of protective clothing or fuel-containment cells for race cars. Although such techniques have been used effectively, it is slow and its success is limited by the skill of the operator. Poor joinder seams can occur if the hot air is applied for too long or too short a period of time or if the roller element is not used properly or in a timely fashion.

Automated equipment for fusing thermoplastic sheets can be divided into two groups. One group can be referred to as comprising rotary machines (the other group is comprised of press-type machines), and in this rotary machine group either the machine travels along the fused seam regions of the sheets to be joined or the sheet seam regions are passed through the machine. As the machine and thermoplastic sheets are moved relative to each other a heat source such as a hot air blower, infrared radiator, or heated wedge is used to heat the sheet areas to be fused. The heat source is followed by a pressure roller or combination of pressure rollers and sometimes by pressure exerting belt surfaces. Such rollers or belt surfaces force the sheet seam areas together and allow them to fuse together.

Machines of the rotary type are particularly useful for assembling large membranes in factories as well as in the field and are used extensively in the roofing and water containment industries. Due however to distortion of the sheets introduced by the motion of the pressure rollers and also due to sheet seam shrinkage during cooling, seams made with this equipment are seldom adequate in applications requiring a high degree of aesthetics as in awning applications or requiring a very flat seam such as is used in sign facings. Also, these machines generally do not maintain the seam under pressure throughout the cooling process and such allows certain materials to generate gasses within their structure and often results in seams weakened by large quantities of contained gas bubbles.

The second group of thermoplastic sheet fusing machines (the press type) are usually stationary during operation, and the thermoplastic sheet seam components to be joined are placed in the machine in their desired position with respect to each other. The machine is then actuated and seam fusing takes place over an extended area at one time rather than over the area linearly with time.

One commonly used press type machine is the radio-frequency welder. This type of machine usually consists of a frame supporting two opposing dies or platens, one of which is relatively stationary and the other relatively movable. Thermoplastic sheets to be fused are placed between the dies/platens and pressed. The sheets are then heated by passing radio-frequency energy through the sheets using the die/platen elements as antennas. When adequate heat has been generated to fuse the sheets, the radio-frequency energy is withdrawn (stopped) and the fused area is allowed to cool. The dies or platens are afterwards separated and the fused sheets removed.

Radio-frequency welders produce highly reliable and aesthetically superior seams, largely because the seam remains pressed between the press platens throughout the heating and cooling cycles. This stabilizes the fused area preventing shrinkage and warpage as well as insuring a uniformly consistent seam surface texture. Although the machine is generally successful, it does however suffer from certain shortcomings. When a sealed seam is being made, the area between the machine platens or dies must be filled with a material of uniform dielectric constant value. If such is not the case, radio-frequency energy will tend to concentrate in areas of least dielectric resistance and cause overheating at those locations. Such makes it very difficult to fuse sheet pieces smaller than the platens, to do intermittent seals, or to incorporate any metallic items in or near the fused areas.

A second press-type machine is the hot platen welder which is made in a number of different configurations. Generally the hot platen welder utilizes one or two heated platens to both press the materials together and transfer heat to the area to be fused. Although hot platen welders are effective for heating thermoplastics they do not provide control of the cooling process. The result being that some materials fuse successfully while others suffer from shrinking or distortion. Further problems arise from the tendency of some materials to generate gas bubbles if not maintained under pressure when heated and cooled. This may cause a sponge-like texture within the fused area thus making the seam weak and unacceptable.

Although many machines are available commercially for fusing thermoplastic sheet materials, none has yet adequately addressed the problems involved in making highly reliable and aesthetically superior seals of varying size and shape. Nor is automatic equipment available to do complex fabrications, especially those incorporating varying numbers of plies.

There is therefore the need for a machine capable of applying even heating to thermoplastic sheets in complex product configurations of varying thicknesses, and to maintain those sheets under controlled pressure and in a stabilized condition throughout controlled heating and cooling cycles.

Other objects of the present invention will become apparent during a careful consideration of the descriptive materials and claims which follow.

SUMMARY OF THE INVENTION

The press apparatus of the present invention is basically comprised of a pair of opposed press platen elements and actuation means for moving at least one such press platen element relative to the other to establish both a press open condition whereat thermoplastic sheet material components may be inserted/removed before and after thermal processing and a press closed condition whereat thermal processing is accomplished. Each press platen element includes or contains an interiorly-positioned diaphragm set element. The press platen diaphragm sets are positionally located in opposed relation to each other and each set is comprised of a pair of peripherally-joined diaphragm members that are functionally connected to inlet and outlet fluid lines. Such fluid lines are selectively activated to conduct a flow of pressurized fluid such as compressed air or a thermally-conductive liquid to and from the diaphragm set. Also, the diaphragm set diaphragm members are each preferably fabricated of a conventional compliant (flexible) and fluid-impervious membrane material that preferably is fiber-reinforced, thermally-conductive, and capable of utilization at relatively high press operating temperatures (e.g., to 600° F.).

In addition, the press apparatus of the present invention includes a heat source, which in a preferred embodiment takes the form of a copper or aluminum heater block element of high compressive strength having an embedded or otherwise cooperating electrical resistance heating element, and independently operable actuating means for advancing and retracting the heater block elements into and from physical contact with the diaphragm sets contained in the press platen elements for heat transfer control purposes.

From a method standpoint, the present invention basically involves: placing the thermoplastic sheet materials to be joined into the press apparatus with their intended seam regions in alignment with and between the opposed press platen elements and included diaphragm sets which are in an open condition; advancing the opposed press platen elements and included diaphragm sets relative to each other and into contact with the properly placed thermoplastic sheet materials; locking or maintaining the press platen elements and their contained diaphragm sets in their closed condition; advancing the press apparatus heater block elements into contact with the collapsed diaphragm sets and lock or otherwise maintain the same in position; introducing moderately-pressurized fluid into said diaphragm sets to particularly inflate their peripheries thereby to both tighten the diaphragm set compliant membrane element interior surface portions and securely clamp the thermoplastic material components in place between such interior surface portions; transferring sufficient heat from the heater block portions; and by conductance, successively through the press platen diaphragm set diaphragm members in their collapsed condition, and into the clamped thermoplastic sheets to fuse the clamped thermoplastic sheets throughout an essentially diaphragm-defined product seam area; separating each heater block element from contact with it's respective diaphragm set by a small distance; flowing relatively cool pressurized fluid through the diaphragm sets and particularly between the compliant membrane element interior surface portions to thereby cool the still clamped-in-position and thermally bonded thermoplastic sheet materials; and, after adequate seam cooling has been obtained, relieving the fluid pressure from within the diaphragm sets and separating the resulting collapsed diaphragm sets sufficiently to permit removal of the completed product assembly or permit advancing the product assembly to its next position for continued seam joining. The method steps may then be repeated as often as necessary to complete fabrication of the product assembly.

A more detailed understanding of the apparatus and method aspects of the present invention will developed by the description of the drawings, detailed description, and claims which follow.

DESCRIPTION OF THE DRAWINGS

FIG. 5 is a sectional view similar to FIG. 4 but illustrating the inflated condition of the included pair of diaphragm sets during product assembly cooling.

DETAILED DESCRIPTION

Figure 1:
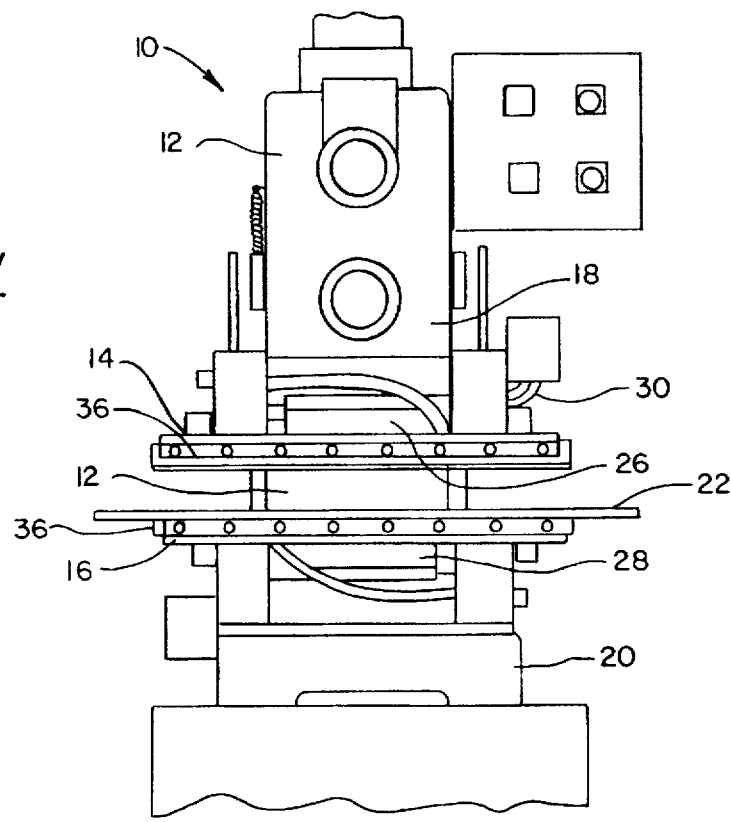
FIG. 1 is a front elevation view of a preferred embodiment of the press apparatus of this invention as readied for the insertion of overlapped thermoplastic sheet materials which are to be thermally fused.
Figure 2:
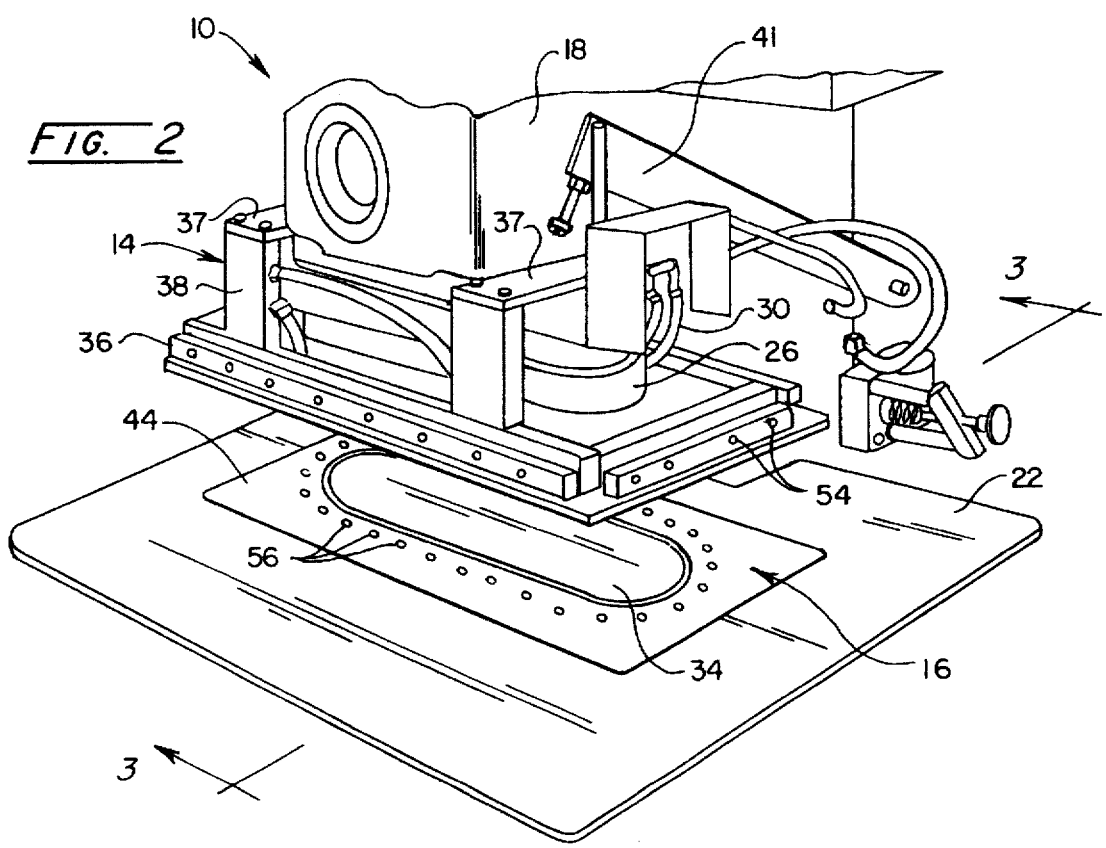
FIG. 2 is an enlarged isometric view of a portion of the apparatus of FIG. 1 better illustrating the relative positioning of the press opposed platen elements and one of the included pair of diaphragm sets.

Referring to FIG. 1, a preferred embodiment of the press apparatus of the present invention is referenced generally as 10 and such is basically comprised of a press frame 12 and a pair of opposed platen assemblies 14 and 16 situated in the press throat area positioned between the press frame head portion 18 and press frame base portion 20. In the FIG. 1 press configuration, upper platen assembly 14 may be moved vertically toward and from platen assembly 16. Lower platen assembly 16 in the FIG. 1 press configuration is fixedly mounted on the press frame base 20. A work table element 22 is also provided adjacent platen assembly 16 and functions to support thermoplastic sheet material components inserted in apparatus 10 for thermal fusion. The platen assemblies 14 and 16 each have a diaphragm set 32 and 34 described in detail hereinbelow.

Press apparatus 10 also includes two aluminum heater block assemblies 26 and 28 which each cooperate with, but are movable vertically with respect to, one of the platen assemblies 14 and 16. Heater block assembly 28 may be raised into engagement with the diaphragm set 34 of stationary platen assembly 16 or retracted out of engagement therewith by means of any conventional actuating means. Looking at FIGS. 2 through 5, it may be seen that the upper heater block assembly 26 carries platen assembly 14 and may be moved vertically by a press cylinder/piston combination (not shown). Platen assembly 14 includes a diaphragm set 32 which is mounted in a frame subassembly 36 having a plurality of vertical support members 38. Support members 38 are connected to a pair of horizontal support members 37 which rest upon the top surface of heater block assembly 26 such that platen assembly 14 is loosely suspended from the heater block assembly 26. Consequently, as heater block assembly 26 is lowered, diaphragm set 32 of platen assembly 14 also is lowered into contact with diaphragm set 34 of platen assembly 16. Assembly 14 may be clamped into position against lower platen assembly 16 by a locking bar mechanism 41. Subsequent to the engagement of upper platen assembly 14 with lower platen assembly 16, heater block assembly 26 may be lowered further to contact diaphragm set 32. From this it may be seen that heater block assembly 26 may be moved vertically a limited distance independently of platen assembly 14. Of course, platen assembly 14 need not be suspended from heater block assembly 26. Platen assembly 14 may be constructed to be raised and lowered vertically entirely independently of heater block assembly 26.

Figure 3:
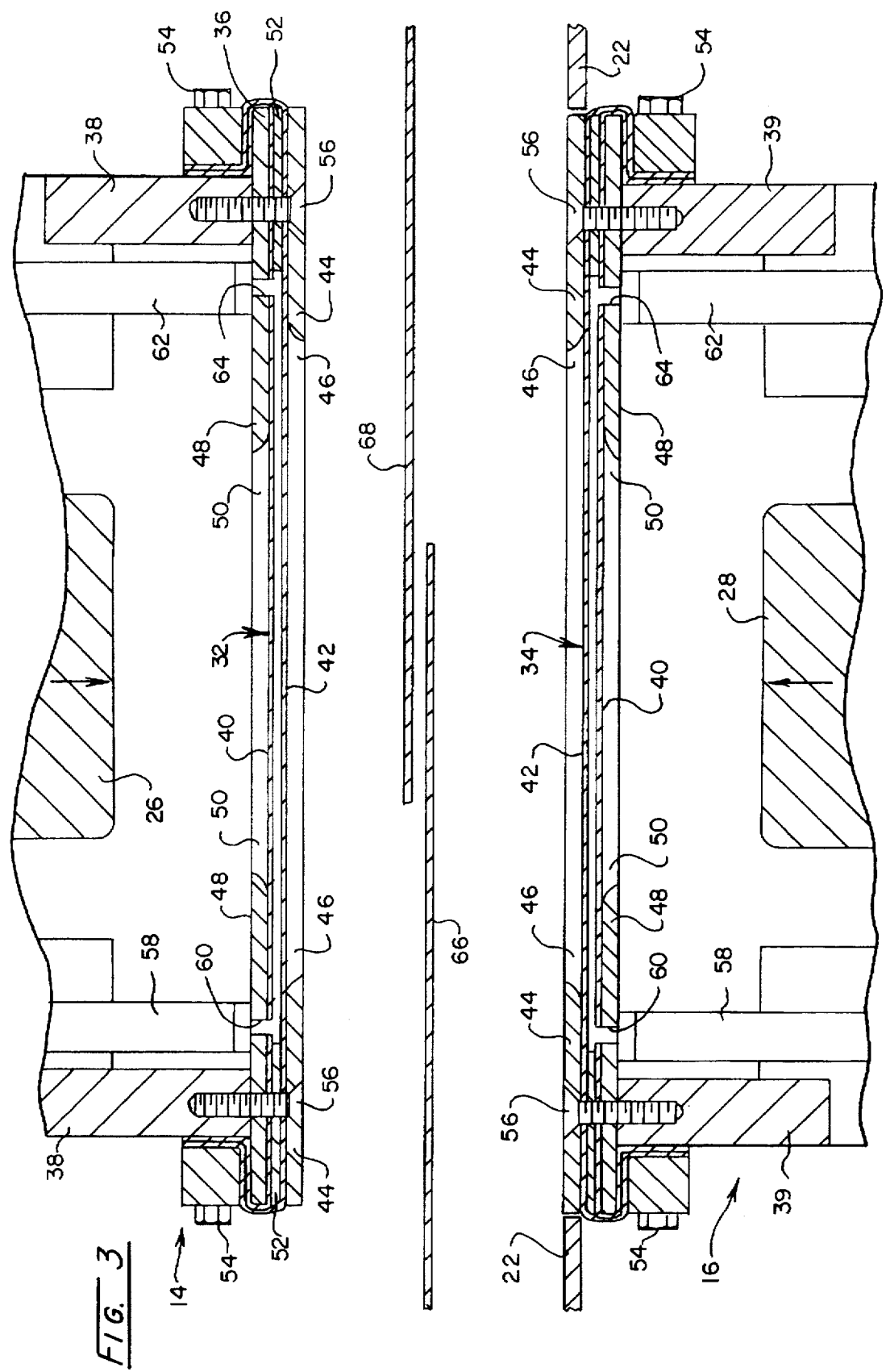
FIG. 3 is a sectional view through a portion of the apparatus of FIGS. 1 and 2 illustrating the positioning of the included pair of diaphragm sets in their initial, spaced-apart condition.
Figure 4:
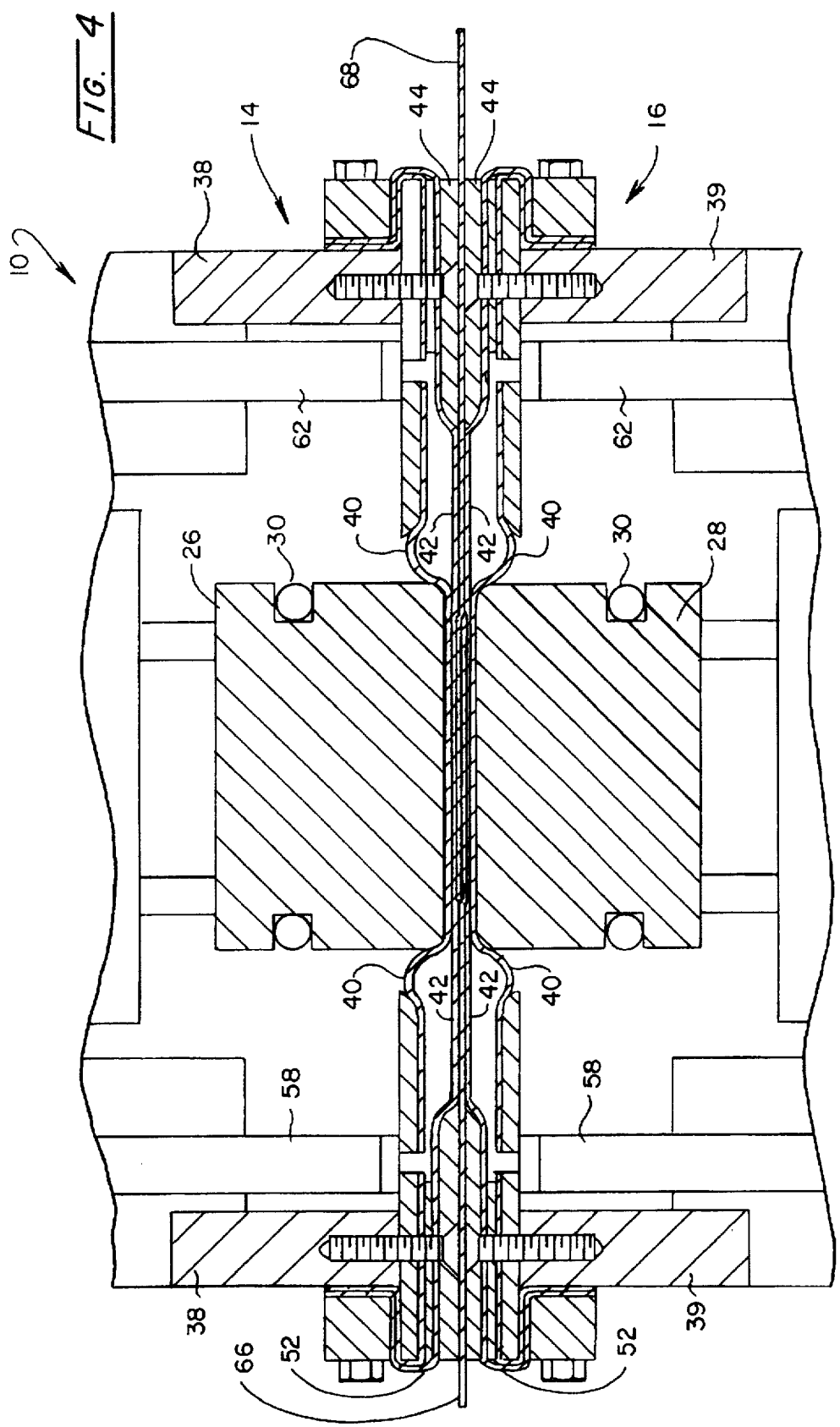
FIG. 4 is a sectional view similar to FIG. 3 but illustrating the position of the included pair of diaphragm sets in a subsequent closed and material-contacting condition.

Referring to FIGS. 3 through 5, it may be seen that diaphragm sets 32 and 34 each are comprised of a pair of compliant membrane elements 40 and 42. Each of the membrane elements 40 and 42 preferably is fabricated using a thin and commercially available fluid-impervious material such as a relatively thin, silicone and polytetrafluoroethylene film having embedded and cross-woven graphite fiber reinforcement strands. Glass fiber reinforcement strands also may be utilized. In addition to having a characteristic of being relatively impervious to the penetration or fluids such as compressed air or pressurized heat-transfer fluids, membrane elements 40 and 42 also preferably have the properties of being good conductors or transmitters of heat with excellent physical integrity at elevated operating temperatures in the range of 300° F. to 600° F.

Platen assembly 14 includes a frame subassembly 36 comprised of an upper frame plate element 44 having an interior opening 46, an upper frame plate element 48 having an interior opening 50, a spacer frame gasket element 52 having an interior opening somewhat larger than either of interior openings 46 and 50, and various fastener elements 54 and 56 for joining components 40 through 52 into a unitary subassembly 36 shown secured to support members 38. The frame subassembly 36 included in lower platen assembly 16 is essentially comprised of the same elements 40 through 56 but secured to platen support elements 39 in a relatively inverted position.

It should also be noted that each platen assembly 14 and 16 includes a schematically illustrated fluid line 58 which functions to supply pressurized fluid to that assembly and which communicates with the interior of its respective diaphragm set 32 or 34 through an opening 60 in frame plate element 48. Each of assemblies 14 and 16 also includes a schematically illustrated fluid line 62 which also communicates with the interior of its respective diaphragm set but through another opening 64 in frame plate element. Each of fluid lines 62 functions to flow pressurized fluid from within a diaphragm set interior. Valving and valve controls associated with fluid lines 58 and 62 are conventional and are not illustrated in the drawings.

FIG. 3 also illustrates two thermoplastic sheet workpieces 66 and 68 which are positioned intermediate platen assemblies 14 and 16 and that are to be subsequently joined into a unitary structure by the operation of apparatus 10. For clarity of illustration, workpieces 66 and 68 are shown suspended intermediate platen assemblies 14 and 16; in practice, however, those workpieces are supported on the lower platen frame assembly 36 and its surrounding work table 22 with the workpiece area at which the workpiece seam is to be formed being positioned in alignment with the diaphragm sets 32 and 34 of opposed platen assemblies 14 and 16.

Additional FIGS. 4 and 5 are similar to FIG. 3 but illustrate the positioning and operating condition of apparatus 10 at critical points in the method of apparatus operation. Referring to FIG. 4, for instance, following the proper positioning of workpieces 66 and 68 on worktable 22, platen assembly 14 is advanced from its retracted position to a point where such workpieces become clamped in their proper position and between the opposed platen assembly plate elements 44. Each of heater block elements 26 and 28, preferably in a preheated condition, is then advanced to a position whereby it contacts its respective cooperating diaphragm set 32 and 34 compliant membrane member 40 or 42 and also functions to additionally clamp workpieces 66 and 68 together, particularly in the seam area that is to be formed. Next a pressurized fluid, frequently compressed air at an operating pressure of approximately 10 psig. (pounds per square inch gauge), is introduced through fluid line 58 and retained in the interior of each diaphragm set 32 and 34 to further clamp the workpieces together. (Fluid lines 62 previously are valved to a "closed" condition). Simultaneously, heat is transferred from each heater block element 26 and 28 by conductance through membrane members 40 and 42 and into the workpieces. Heat transfer is continued for a sufficient time to cause the thermoplastic resin in the coextensive seam areas of workpieces 66 and 68 to fuse together. Depending on the thickness of the workpieces, the nature of the workpiece thermoplastic resins involved, the thicknesses and thermal conductances of diaphragm sets 32 and 34, and the surface temperatures of heater block elements 26 and 28, the time required for adequate seam area fusion may be to a little as 15 seconds.

FIG. 4 also illustrates the "inflated" condition of each of diaphragm sets 32 and 34 during workpiece seam area heating.

When the fusing of workpiece seam area thermoplastic resins is sufficiently complete each of heater block elements 26 and 28 is retracted (withdrawn). Pressurized fluid used in the processing is then caused to be flowed through each of diaphragm sets 32 and 34 to act as a coolant while the workpiece seam area remains fully restrained by the adjacent compliant membrane members 40 and 42. (The valving for fluid lines 62 is changed to an "open" condition and frequently the operating pressure of the pressurized fluid is increased sufficiently (e.g., compressed air at 15 psig.) to give an adequate coolant flow rate. Adequate cooling often is accomplished in apparatus 10 in as little time as 30 to 60 seconds. Since workpiece cooling is accomplished with simultaneous workpiece seam area restraint by platen assemblies 14 and 16 and their pressurized compliant membrane members 40 and 42, workpiece material in and also surrounding the seam area is prevented from bubbling, stretching, or otherwise undergoing some type of deformation or distortion.

Subsequently, locking bar mechanism 41 is unlocked to enable press platen assembly 14 and heater block assembly 26 to be returned to their initial, spaced-apart position relative to platen assembly 16. Thereafter, the joined workpieces are then either removed from apparatus 10 or are moved to their next position on worktable 22 for continued seaming operations.

It is to be understood that the foregoing detailed description of a preferred embodiment is illustrative only and that it will be apparent to those skilled in the art that various changes as to size, shape, and composition of the elements of this invention and changes as to process step parameters may be made without departing from the scope or intent of the present invention.

I claim my invention as follows:

1. In a method of bonding together workpieces of thermoplastic sheet material supported in press-type apparatus having a platen, an inflatable diaphragm set having a pair of membranes positioned in the platen, a heat source movable into and from contact with the inflatable diaphragm set, and a source of pressurized fluid, the steps of:

clamping the supported workpieces with the platen and with the membranes of said compliant diaphragm set in an non-inflated condition;

moving the heat source into contact with the diaphragm set to thereby commence heating the clamped workpieces with heat conducted through the membranes of said non-inflated diaphragm set;

inflating the diaphragm set around its periphery with pressurized fluid flowed from the source of pressurized fluid to between said membranes to thereby further clamp the clamped workpieces;

continuing the heating of the additionally clamped workpieces by continuing the contact of the heat source with the inflated diaphragm set until the workpieces are sufficiently heated for thermal bonding purposes;

retracting the heat source from contact with the inflated diaphragm set;

flowing pressurized fluid from the source of pressurized fluid between the membranes of diaphragm set sufficient to cool the heated and clamped workpieces thereby causing bonding of the workpieces together while clamped; and deflating said pair of membranes of the inflated diaphragm set and unclamping the bonded workpieces prior to removal of the bonded workpieces from the press-type apparatus.

2. The method defined by claim 1 wherein said pair of membranes of said diaphragm set is inflated around its periphery using a pressurized fluid at an elevated pressure in the range of not more than approximately 10 psig.

3. The method defined by claim 1 wherein said heat source is at a temperature in the range of approximately from 300° F. to 600° F.

4. In a method of bonding together workpieces of thermoplastic sheet material supported in press-type apparatus having a pair of platen assemblies, each platen assembly having an inflatable diaphragm set having a pair of membranes, a pair of heat sources, each movable into and from contact with a diaphragm set, and a source of pressurized fluid, the steps of:

clamping the supported workpieces between the pair of platen assemblies and with the pairs of membranes of said inflatable diaphragm sets in a non-inflated condition;

moving the heat sources into contact with the diaphragm sets to thereby commence heating the clamped workpieces with heat conducted through the membranes of the non-inflated diaphragm sets;

inflating the diaphragm sets around their peripheries with pressurized fluid flowed from the source of pressurized fluid to said pairs of membranes to thereby further clamp the clamped workpieces;

continuing the heating of the additionally clamped workpieces by continuing the contact of the heat sources with the inflated diaphragm sets until the workpieces are sufficiently heated for thermal bonding purposes;

retracting the heat sources from contact with the inflated diaphragm sets;

flowing pressurized fluid from the source of pressurized fluid between each pair of membranes of said inflated diaphragm sets sufficient to cool the heated and clamped workpieces thereby causing bonding of the workpieces together while clamped; and deflating each pair of membranes of the inflated diaphragm sets and totally unclamping the bonded workpieces by separating said platen assemblies relative to each other prior to removal of the bonded workpieces from the press-type apparatus.

5. The method defined by claim 4 wherein said pairs of membranes of said diaphragm sets are inflated around their peripheries using a pressurized fluid at a pressure not exceeding approximately 10 psig.

6. The method defined by claim 4 wherein said heat sources are at a temperature in the approximate range of 300° F. to 600° F.

* * * * *